No. 710,558. Patented Oct. 7, 1902.
W. D. BAXTER.
DRAFT EQUALIZER.
(Application filed Aug. 15, 1902.)
(No Model.)
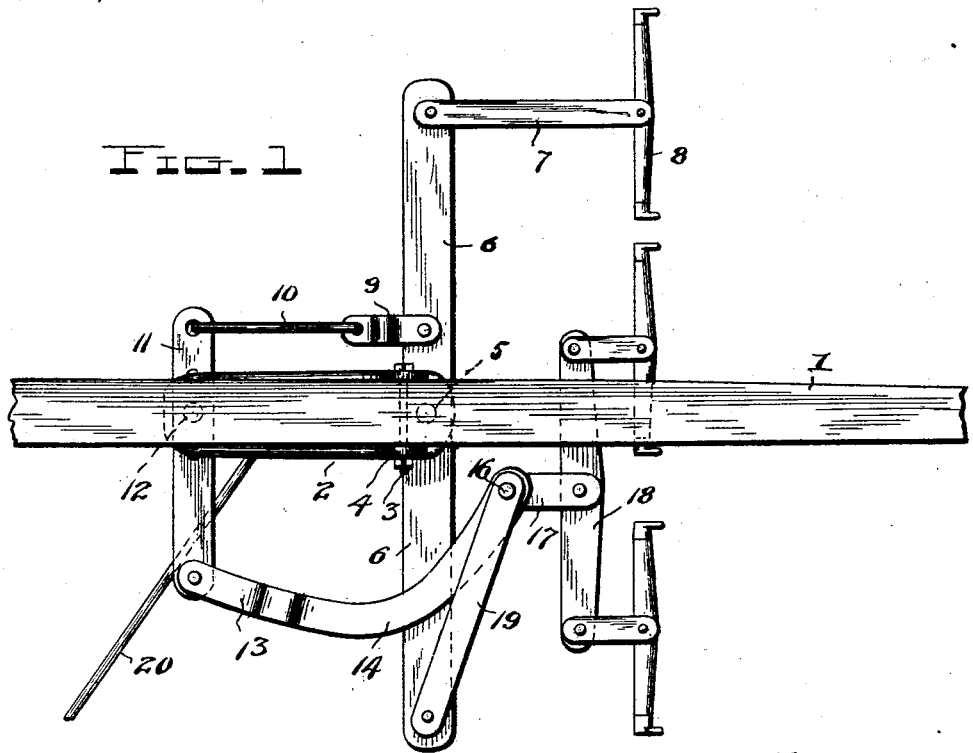
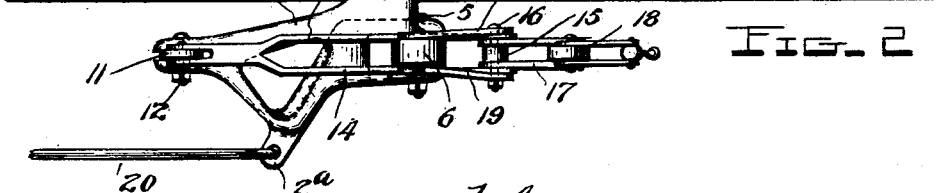
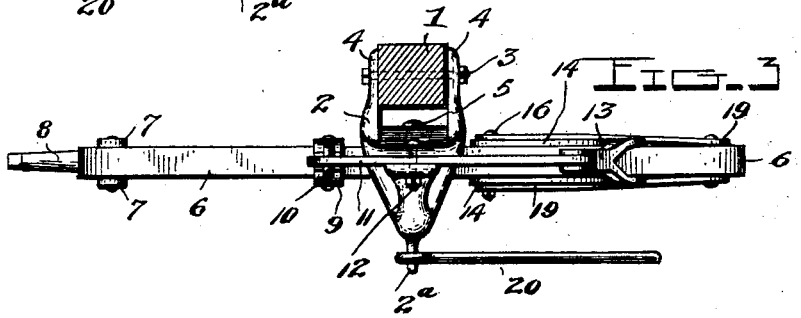
Inventor
W. D. Baxter

UNITED STATES PATENT OFFICE.

WILLIAM DANIEL BAXTER, OF EWING, NEBRASKA.

DRAFT-EQUALIZER.

SPECIFICATION forming part of Letters Patent No. 710,558, dated October 7, 1902.

Application filed August 15, 1902. Serial No. 119,744. (No model.)

*To all whom it may concern:*

Be it known that I, WILLIAM DANIEL BAXTER, a citizen of the United States, residing at Ewing, in the county of Holt and State of Nebraska, have invented certain new and useful Improvements in Draft-Equalizers; and I do declare the following to be a full, clear, and exact description of the invention, such as will enable others skilled in the art to which it appertains to make and use the same.

My invention relates to certain new and useful improvements in draft-equalizers, and particularly to that class of devices for use on mowers and other agricultural machines on which three-horse teams are used.

The object of the invention is to produce an equalizer in which the draft upon each animal will be the same and in which the heavy side draft found in mowers and other agricultural machinery will be entirely overcome.

A further object is to provide a device in which the pull will be upon both the tongue and the draft-rod, which is secured to the shoe on the sickle-bar of a mower or to any portion of a machine.

With the above and other objects in view, which will readily appear as the nature of the invention is better understood, said invention consists in certain novel features of construction and combination and arrangement of parts which will be hereinafter fully described and claimed, and illustrated in the accompanying drawings, in which—

Figure 1 is a top plan view of my improved draft-equalizer. Fig. 2 is a side elevation of the same. Fig. 3 is a rear elevation showing the pole or tongue in section.

Referring now more particularly to the drawings, the numeral 1 designates the pole or tongue of a mower or other machine or vehicle.

2 denotes a bracket located upon the under side of the tongue and pivoted thereto by means of the pin or bolt 3, passing through its upwardly-projecting ears or lugs 4. The said bracket, which is preferably a casting, has a slight swinging movement in a vertical plane. Pivoted at its center at 5 in the front portion of the bracket directly beneath the tongue 1 is the long lever or evener 6, to one end of which is pivoted, by means of the straps 7, the singletree 8. Upon the same arm of the lever adjacent to the tongue is pivoted the clevis 9, which is connected by the link 10 to the short arm of the short lever or evener 11, which is located in rear of the long lever 6 and is pivoted to the rear portion of the bracket 2 by the bolt or pin 12, passing through one of a plurality of apertures, by means of which the lengths of the arms of the short lever 11 may be changed.

To the long arm of the short lever, which extends upon the opposite side of the tongue, is pivoted the curved bifurcated draw-bar 13. The arms 14 of said bar formed by the bifurcation are spaced apart by the cylindrical sleeve 15, and a bolt 16, passing through the same and the straps 17, which carry the doubletree 18, pivots the said parts together. The oblique straps or links 19, located one above and one below the arms 14, are also pivoted to said arms by the bolt 16 and have their opposite ends pivoted to the end of the arm of the long lever 6, which extends through the bifurcated draw-bar 13.

The bracket 2 is formed upon its under side with a downwardly-projecting extension $2^a$, to which is loosely secured one end of the draft-rod 20, which extends obliquely and rearwardly and has its opposite end secured to the shoe of the sickle-bar of a mower or to any portion of a machine to overcome the side draft of the same.

The operation of the device is as follows: The three draft-animals are attached to the singletrees. The one attached to the singletree 8 is enabled, by means of the leverage obtained through the arrangement described, to hold an equal position with the two attached to the singletrees carried by the doubletree 18. My particular arrangement, together with the draft-rod 20, also obviates the side draft, which is so objectionable.

From the foregoing description, taken in connection with the accompanying drawings, it is thought that the construction, operation, and advantages of my improved draft-equalizer will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination with the pole or tongue of a machine or vehicle; of a draft-equalizer consisting of a bracket pivoted to said pole or tongue, a lever pivoted to the said bracket and carrying a singletree upon one arm, and straps or links to which the doubletree is attached on its opposite arm, a second lever adjustably pivoted to said bracket having one of its arms connected to the arm of the first-mentioned lever which carries the singletree, and its opposite arm connected to said straps or links, and a draft-rod connecting said bracket and the machine or vehicle to overcome the side draft, substantially as specified.

2. The combination with the pole or tongue of a machine or vehicle; of a draft-equalizer comprising a bracket pivoted to said pole or tongue and formed with a downwardly-projecting extension, a long lever pivoted centrally in the forward portion of said bracket, one arm of said lever carrying a singletree and the other arm carrying the pivoted straps or links to which is secured the doubletree, a short lever adjustably pivoted in the rear portion of said bracket, the short arm of which is connected by the clevis and link to that arm of the first-mentioned lever to which the singletree is attached, and the long arm of which is connected by the bifurcated draw-bar to the said straps or links, and a draft-rod connecting said extension upon the bracket and the machine or vehicle, substantially as and for the purpose set forth.

In testimony whereof I have hereunto set my hand in presence of two subscribing witnesses.

WILLIAM DANIEL BAXTER.

Witnesses:
W. N. DAWSON,
I. D. McCLOW.